Figure 1:
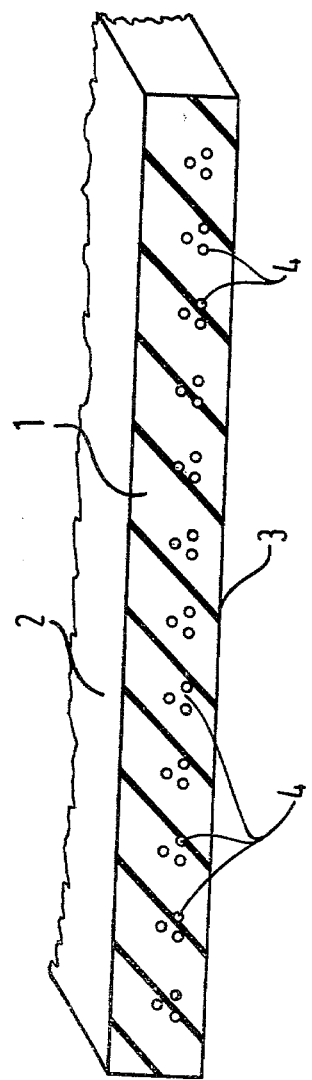

United States Patent [19]

Ballocci et al.

[11] 4,351,432
[45] Sep. 28, 1982

[54] CONVEYOR BELT

[75] Inventors: Giovanni Ballocci; Aurelio Brollo, both of Milan, Italy

[73] Assignee: Industrie Pirelli S.p.A., Milan, Italy

[21] Appl. No.: 129,328

[22] Filed: Mar. 11, 1980

[30] Foreign Application Priority Data

Mar. 27, 1979 [IT] Italy .............................. 21302 A/79

[51] Int. Cl.³ .................... F16G 1/22; B65G 15/34
[52] U.S. Cl. .................................... 198/847; 474/260
[58] Field of Search ....................... 474/237, 260, 261; 198/844, 846, 847

[56] References Cited

U.S. PATENT DOCUMENTS 1,192,362  7/1916  Young .............................. 474/237
3,545,293 12/1970  Marzocchi et al. ............... 474/260
3,574,022  4/1971  Lampert .......................... 198/846

FOREIGN PATENT DOCUMENTS 133294  6/1949  Australia ........................... 474/260
2209752 9/1973  Fed. Rep. of Germany ...... 198/847
5221549  2/1977  Japan ............................... 474/260

*Primary Examiner*—Lawrence J. Staab
*Attorney, Agent, or Firm*—Stevens, Davis, Miller & Mosher

[57] ABSTRACT

An endless conveyor belt has an elastomeric body and a tension resistant member embedded therein. The tension resistant member comprises a plurality of spaced sets of three textile or metal cords each which extend longitudinally through the belt body and are substantially parallel to the faces of the belt. The cords are spaced from each other to outline a portion of the belt which has a substantially equalateral triangular shape in cross-section with the cords at the apices.

2 Claims, 2 Drawing Figures

CONVEYOR BELT

This invention relates to a conveyor belt and more particularly to a tension resistant structure of a conveyor belt.

Generally, a conveyor belt is constituted by a band of elastomeric material provided with an embedded tension resistant structure.

Different types of tension resistant structures for reinforcing conveyor belts are already known such as, for example, a belt reinforced with a plurality of cords which are coplanar and parallel to each other and whose axes lie on a plane which is the neutral plane of the conveyor belt.

As known, the tension resistant structure of a conveyor belt must be suitable for withstanding all the stresses acting on the belt including the stresses due to the geometrical configuration that the conveyor belt assumes during its use, the stresses due to the weight of the material conveyed by the belt and the stresses due in general to impact and in particular to the impacts on the belt occuring while it is loaded with the material to be conveyed.

Those conveyor belts in which the tension resistant structure is exclusively a plurality of parallel and coplanar cords suffer an unsatisfactory increase in resistance to fatigue which results in an unsatisfactory useful life for the belt as the diametric dimensions of the cord increase.

Moreover, by increasing the diameters of the cords used as the tension resistant insert, the weight of the conveyor belt is increased because, in order to guarantee perfect embedding of the cords in the belt, it is necessary that the thickness of the elastomeric material between the cords and the faces of the belt be increased on the same order of magnitrude as the diameter of the cords.

Another disadvantage of the known conveyor belts having as their tension resistant structure a plurality of parallel and coplanar cords is that by increasing the diameter of the single cords during the building of the belt, the adhesion between the cords and the elastomeric material forming the belt becomes more difficult.

A further drawback of the known conveyor belts is that in order to permit the belt, and its tension resistant insert to withstand high stresses, the cords must have a larger diameter then should be required by a cord made from the material used in forming the cord.

In fact, the increase of the cord diameter reduces the mechanical characteristics of the material constituting the cords because of the increase of the number of twists that the threads forming the cords must undergo. Hence, when increasing the load which the conveyor belt can convey, it is necessary to use cords having a larger diameter than should be required in view of the mechanical resistance of the material from which the cord is made. Consequently, for a certain length of belt, there is a limit value of maximum permissible load which cannot be exceeded.

The foregoing drawbacks involve the further drawback of high cost of the belt.

An object of the invention is to provide a conveyor belt having a tension resistant structure formed only by a plurality of cords which has a longer useful life than that of the known conveyor belts having the same mechanical resistance and which can be made at a lower cost. Another object of the invention is to provide an elastomeric conveyor belt reinforced with tension resistant textile or metallic cords which is adapted to carry a heavier load than the prior art elastomeric conveyor belts reinforced with a corresponding type of cord.

Figure 2:
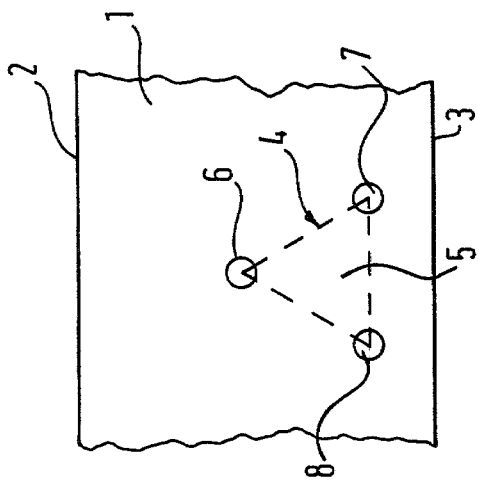

Other objects of the invention will become apparent from the following description with reference to the accompanying drawing wherein FIG. 1 is a perspective view of a portion of one embodiment of the invention; and FIG. 2 is an enlarged, fragmentary plan view of the embodiment of FIG. 1.

The foregoing objects and others are accomplished in accordance with this invention, generally speaking, by providing an elastomeric conveyor belt reinforced with sets of grouped flexible and inextensible cords embedded therein which extend longitudinally through the belt and resist tension on the belt. Each set of cords is formed by a group comprising three cords and the axis of symmetry of each set lies on a plane substantially parallel to the faces of the belt.

Referring now to the drawing, as shown in FIGS. 1 and 2, a preferred embodiment of the conveyor belt of the invention has an endless elastomeric band 1 having a face 2 on which material to be conveyed is placed and an opposite face 3 which contacts support members and drive members for rotating the belt around longitudinally spaced guide rolls.

Three nylon (aliphatic polyamide) cords, 6, 7 and 8 are grouped into laterally spaced sets 4 embedded in band 1 as a tension resistant structure. Sets 4 of cords 6, 7 and 8 extend longitudinally through band 1 and are disposed substantially parallel to each other, to the longitudinal axis of the belt and to the faces 2 and 3. Cords 6, 7 and 8 may be, instead of nylon, polyester fibers, metal wire such as steel wire, fiber glass or the like. The elastomer forming the body of the belt may be natural rubber, a synthetic elastomer such as chloroprene, polyurethane or the like.

In particular, as shown in FIG. 2, each set 4 is formed by three cords 6, 7 and 8 whose axes are arranged at the vertices of a triangle and preferably of an equilateral triangle represented with short dash lines in FIG. 2.

Moreover, as shown in FIGS. 1 and 2, two cords 7 and 8 of each set have axes which lie on a plane parallel to the faces of the band 1 of elastomeric material and are near the face 3 of band 1.

By means of the resistant structure provided by the invention, it is possible to realize the objects of the invention. It is believed that this is possible because of the following explanation but the applicants do not wish to be bound thereby:

First of all, the use of a set of cords, each set being formed by three cords, instead of single cords mechanically equivalent to them, makes it possible to reduce the thickness of elastomeric material arranged between the sets of cords and the faces of the conveyor belt which insures that the sets will be perfectly embedded in the belt.

This makes it possible to provide a lighter belt, with the same resistance characteristics, and to reduce the power necessary for driving the conveyor belt. This results in a reduction of the conveyor belt cost and a reduction of the maintenance costs of the conveyor belt.

Moreover, the resistant structure formed by sets of cords, each set being formed by three cords arranged at the vertices of a triangle extends the useful lifetime of the conveyor belt with the same mechanical resistance of the known conveyor belts, since an increase of the resistance to fatigue of the resistant structure and an increase of the resistance to the stresses due to impact on the belt are obtained.

In fact, under the action of the fatigue stresses on the belt which occur during its passage over the drive rollers and guide rollers, the triangular configuration of the set of cords varies.

This variation of the geometrical configuration of the sets of cords is such that, under the increase of stresses on the belt, the cords approach the neutral plane of the conveyor belt and, consequently, the cords are able to better withstand the stresses since a reduction of the stresses bonded only to the geometrical configuration assumed by the belt happens in the cords themselves.

Moreover, under the impact action, the elastomeric material separating the cords of each set from each other, dissipates the impact force with an accompanying reduction of the stresses on the cords.

Although one embodiment of the invention has been illustrated and described in detail for the purpose of illustration, it is to be understood that such detail is solely for that purpose and that variations can be made by those skilled in the art without departing from the spirit and scope of the invention except as it may be limited by the claims.

What is claimed:

1. A conveyor belt comprising a band of elastomeric material having opposite faces and a tension resistant structure embedded in said band between the faces and formed of a plurality of longitudinally extending cords parallel to one another, characterized by the fact that said cords are grouped in laterally spaced triangularly shaped sets of three cords each of the same kind of material disposed longitudinally through the belt substantially parallel to each other, substantially parallel to the longitudinal axis of the belt, and substantially parallel to the said opposite faces as the sole means for imparting tension resistance to the belt.

2. An endless conveyor belt having an elastomeric body with opposite parallel faces and longitudinally extending embedded flexible and inextensible cords which are the sole means for imparting tension resistance to the belt, all of said cords being of the same kind of material and arranged in sets of three cords each with each set spaced farther laterally from each adjacent set than the cords of the sets are spaced from each other, said cords of each set being substantially parallel to the said faces of the belt and arranged in the belt in the shape of an equilateral triangle with each cord disposed at a vertex of the triangle.

* * * * *